United States Patent
Kitamura

(10) Patent No.: US 10,225,981 B2
(45) Date of Patent: Mar. 12, 2019

(54) ROTATING BODY, MOWER, AND GRASS-MOWING METHOD

(71) Applicant: KABUSHIKI KAISHA KITAMURA SEISAKUSHO, Mie (JP)

(72) Inventor: Kiyoshi Kitamura, Mie (JP)

(73) Assignee: KABUSHIKI KAISHA KITAMURA SEISAKUSHO, Mie (JP)

( * ) Notice: Subject to any disclaimer, the term of this patent is extended or adjusted under 35 U.S.C. 154(b) by 43 days.

(21) Appl. No.: 14/917,831

(22) PCT Filed: Sep. 10, 2013

(86) PCT No.: PCT/JP2013/005348
§ 371 (c)(1),
(2) Date: Mar. 9, 2016

(87) PCT Pub. No.: WO2015/037030
PCT Pub. Date: Mar. 19, 2015

(65) Prior Publication Data
US 2016/0219783 A1  Aug. 4, 2016

(51) Int. Cl.
*A01D 34/416* (2006.01)
*A01D 34/63* (2006.01)

(52) U.S. Cl.
CPC ....... *A01D 34/4166* (2013.01); *A01D 34/416* (2013.01); *A01D 34/63* (2013.01)

(58) Field of Classification Search
CPC .. A01D 34/4166; A01D 34/82; A01D 34/416; A01D 34/4165; A01D 34/63; A01D 34/06; A01D 75/00

(Continued)

(56) References Cited

U.S. PATENT DOCUMENTS 6,298,642 B1 * 10/2001 Harb .................... A01D 34/416
30/276
6,857,480 B2 * 2/2005 Thompson, Sr. ...... A01B 1/065
172/13

(Continued)

FOREIGN PATENT DOCUMENTS

CN        1499924 A      5/2004
JP    2008-148684 A      7/2008

(Continued)

OTHER PUBLICATIONS

International Search Report for the Application No. PCT/JP2013/005348 dated Dec. 17, 2013.

(Continued)

*Primary Examiner* — Phong Nguyen
(74) *Attorney, Agent, or Firm* — Cheng Law Group, PLLC

(57) ABSTRACT

In order to obtain favorable cutting quality throughout a long-term, a rotating body has a brace that rotates integrally with a drive shaft of a mower, and a main body made of synthetic resin that is joined to the brace. The main body includes an upper body that is joined to the brace, a flange portion having a diameter larger than that of the upper body, a lower body having a diameter smaller than that of the flange portion, and an engaging structure with which the linear cutter is engaged. The upper body has, on the outer circumferential surface thereof, a plurality of outlets, from each of which one end of the linear cutter is pulled out. With the upper body integrally joined to the lower body with the flange portion therebetween, the linear cutter that is pulled out of each of the outlets is positioned above the flange portion.

15 Claims, 14 Drawing Sheets

(58) Field of Classification Search
USPC ...... 30/276, 347, 263; 56/1, 17.5, 255, 12.7,
56/17.2, 295, 294, 249, 233
See application file for complete search history.

(56) References Cited

U.S. PATENT DOCUMENTS

| | | | |
|---|---|---|---|
| 9,078,394 B2 * | 7/2015 | Harless | ................ A01D 34/416 |
| 2002/0189107 A1 | 12/2002 | Arnetoli | |
| 2005/0097875 A1 | 5/2005 | Haeufele et al. | |
| 2006/0076152 A1 | 4/2006 | Haufele et al. | |
| 2008/0282552 A1 * | 11/2008 | Arnetoli | ............. A01D 34/4166 |
| | | | 30/276 |
| 2009/0100815 A1 | 4/2009 | Kitamura | |

FOREIGN PATENT DOCUMENTS

| | | |
|---|---|---|
| JP | 2010-178751 A | 8/2010 |
| TW | 473376 B | 1/2002 |
| WO | WO-2007/023758 A1 | 3/2007 |
| WO | WO-2013/100059 A1 | 7/2013 |

OTHER PUBLICATIONS

The First Office Action for the Application No. 201380079453.1 from The State Intellectual Property Office of the People's Republic of China dated Jul. 27, 2017.

\* cited by examiner

ROTATING BODY, MOWER, AND GRASS-MOWING METHOD

TECHNICAL FIELD

The present invention relates to rotating bodies, mowers, and grass-mowing methods, and more particularly to a technique for mowing grass with a linear cutter that can obtain favorable cutting quality throughout a long-term use thereof.

BACKGROUND ART

A linear cutter made of nylon or the like has conventionally been used in mowing.

In such conventional mowing, a rotating body installed with the linear cutter is mounted on the drive shaft of a mower and then the rotating body is rotated together with the drive shaft. In this manner, the linear cutter that is pulled out of the outer circumferential surface of the rotating body can cut surrounding grass (see, for example, JP Pub. No. 2008-148684).

SUMMARY OF INVENTION

In this conventional rotating body described above, the linear cutter, pulled out significantly from the outer circumferential surface of the rotating body, is drawn radially outward by the centrifugal force, keeping a predetermined distance between the linear cutter and the ground surface.

However, various loads from various directions are placed on the linear cutter during mowing. This causes the linear cutter to operate in an irregular manner. In addition, the actual ground surface has various types of unevenness such as rocks.

One of the problems that arise due to these circumstances is that the linear cutter rotating at high speed during mowing in which the conventional rotating body is used, easily comes into contact with the ground surface. When the linear cutter rotating at high speed comes into contact with the ground surface, it becomes difficult to keep the top speed of the linear cutter for the number of times the contact with the ground occurs. This leads to lowering the grass-cutting quality and reducing the life of the linear cutter.

The conventional rotating body, therefore, has a problem that it is difficult to obtain favorable cutting quality of such a linear cutter made of nylon or the like over a long period of time.

Solution to Problem

The present invention was contrived in view of the foregoing problems, and an object thereof is to provide a rotating body, a mower, and a grass-mowing method, with all of which favorable cutting quality of a linear cutter can be obtained over a long period of time.

As a way to achieve the foregoing object, a first invention is a rotating body having the following configuration.

The first invention is a rotating body that is mounted on a drive shaft of a mower and driven to rotate integrally with the drive shaft. The rotating body includes a brace that rotates integrally with the drive shaft, and a main body made of synthetic resin that is joined to the brace. The main body is configured with an upper body that is joined to the brace, a flange portion that is molded to have a diameter larger than that of the upper body, a lower body that is molded to have a diameter smaller than that of the flange portion, and an engaging structure with which a linear cutter is engaged. The upper body has, on an outer circumferential surface thereof, a plurality of outlets, through each of which one end of the linear cutter engaged with the engaging structure is pulled out. With the upper body and the lower body being integrally joined to each other with the flange portion therebetween, the linear cutter that is pulled out of each of the outlets is positioned above the flange portion.

It is preferred that the brace sandwich with a bracket of the mower the rotating blade in a detachable manner and rotate the sandwiched rotating blade integrally with the drive shaft, and that the flange portion be molded to have a diameter smaller than that of the sandwiched rotating blade.

It is preferred that the upper body have a depressed groove on the outer circumferential surface thereof and that the depressed groove be positioned between the outlets that are adjacent to each other in a circumferential direction and be also positioned above the flange portion.

It is preferred that the upper body the flange portion, and the lower body be molded separately, and that the flange portion be joined detachably to the upper body and the lower body.

It is preferred that the upper body be molded integrally with the flange portion and joined detachably to the lower body.

It is preferred that the lower body be molded integrally with the flange portion and joined detachably to the upper body.

It is preferred that the flange portion have, separately from the engaging structure, a second engaging structure with which the linear cutter is engaged.

It is preferred that the upper body have the engaging structure on a lower surface thereof, that the lower body be a donut-shaped grounded section with a through-hole in the center, and that the through-hole houses an end of the drive shaft of the mower and exposes the engaging structure of the upper body downward.

It is preferred that the engaging structure include an engaging element that projects from the lower surface of the upper body and be provided in such a manner that one end of the linear cutter which has an intermediate section thereof engaged with the engaging element, is pulled radially outward from one of the outlets and that the other end of the linear cutter is pulled radially outward from another one of the outlets.

As a way to achieve the object described above, a second invention is a mower equipped with the rotating body having the foregoing configuration.

As a way to achieve the object described above, a third invention is a grass-mowing method having the following configuration.

The third invention is a grass-mowing method including: mounting the rotating body having the foregoing configuration on the drive shaft; pulling one end of the linear cutter, engaged with the engaging structure, out of one of the outlets and driving the rotating body to rotate integrally with the drive shaft in this state; and mowing grass by using a tip section of the linear cutter that extends to a position radially outside of an outer edge of the flange portion.

In this configuration in which: the rotating body is mounted on the drive shaft; one end of the linear cutter engaged with the engaging structure is pulled out of each of the outlets; the rotating body is driven to rotate integrally with the drive shaft in this state; and grass-mowing is executed using the tip section of the linear cutter that extends to a position radially outside of the outer edge of the flange portion. It is preferred that the method further includes removing the linear cutter, which has become short due to use, from the engaging structure, bringing the linear cutter into engagement with the second engaging structure that is located radially outside of the engaging structure, and thereby stretching the tip section of the linear cutter to the position radially outside of the outer edge of the flange portion.

DESCRIPTION OF EMBODIMENTS

The present invention is now described based on the embodiments shown in the accompanying drawings.

FIG. 1 to FIG. 11 each show a rotating body according to the first embodiment of the present invention.

Figure 11:
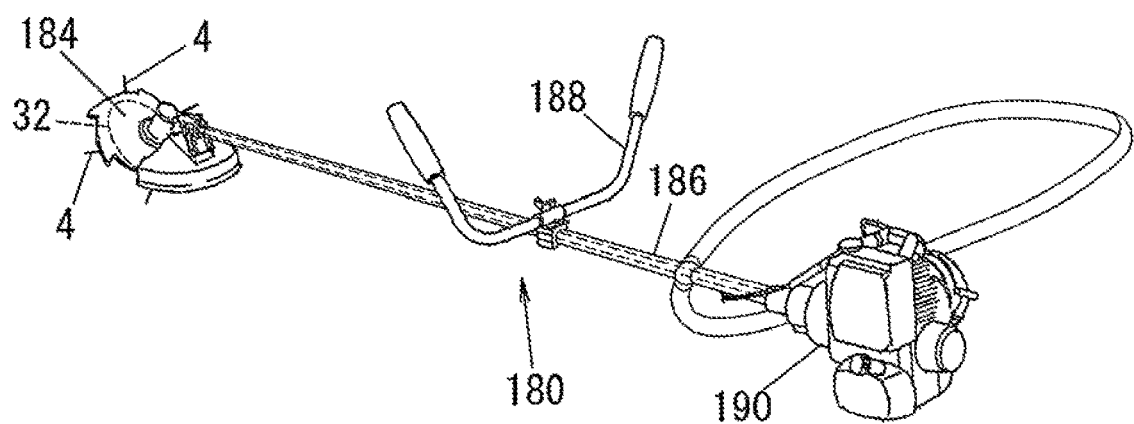
FIG. 11 is a perspective view of the mower mounted with the rotating body according to the first embodiment of the present invention.

The rotating body according to the first embodiment of the present invention is a grounded body that is mounted in a drive shaft 182 of a mower 180 shown in FIG. 11.

The grounded body is structured to be able to selectively mount a disc-shaped rotating blade 184 such as a chip saw and/or (a) linear cutters 4. Linear cutters 4 are each a flexible, elastic member formed by fixing an engaging large-diameter portion 78 to one end of a nylon cord.

Figure 10:
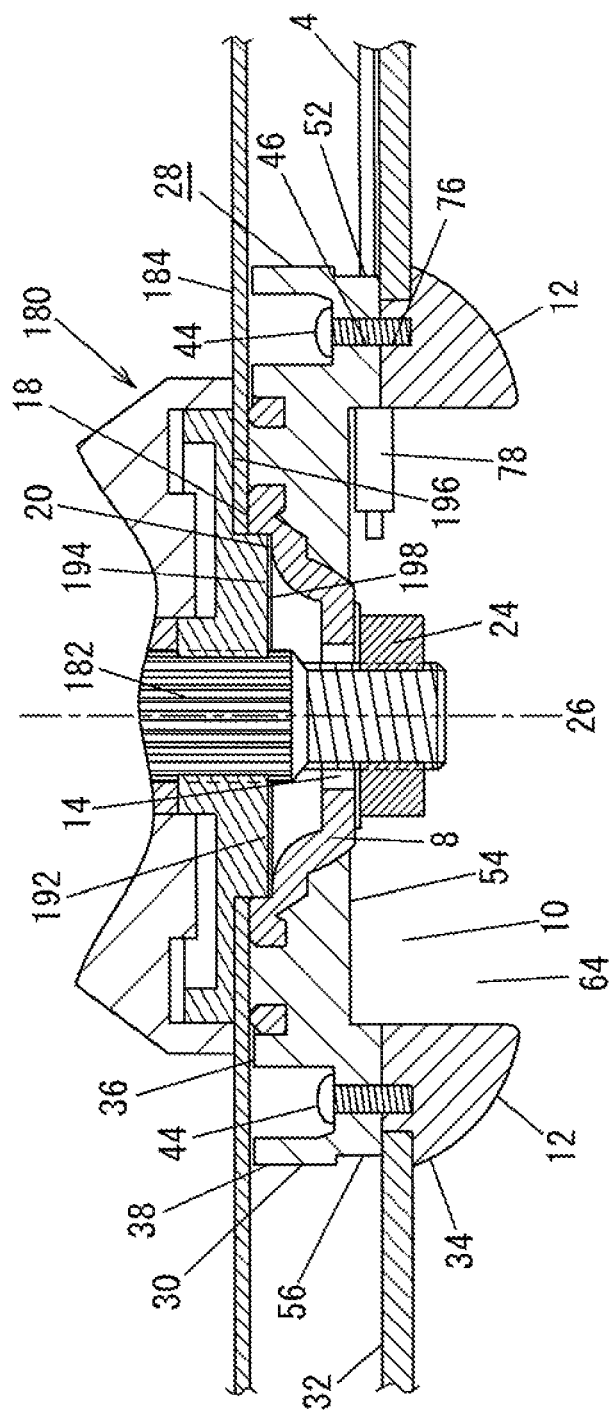
FIG. 10 is a cross-sectional diagram showing a state in which the rotating body according to the first embodiment of the present invention is installed in a drive shaft of a mower.

The mower 180 has a main shaft 186 and the drive shaft 182 extending from a tip of the main shaft 186 (see FIG. 10). The rotating blade 184 is installed detachably to this drive shaft 182 by using the rotating body which is a grounded body.

In this mower 180, a handle 188 is provided in the middle of the main shaft 186, and a rear end section of the main shaft 186 is equipped with an engine 190. By transmitting the output of the engine 190 to the drive shaft 182, the rotating body is driven to rotate integrally with the drive shaft 182. At this moment, the rotating blade 184 and the linear cutters 4 are driven to rotate about a rotation axis 26 (see FIG. 10), integrally with the rotating body.

Figure 1:
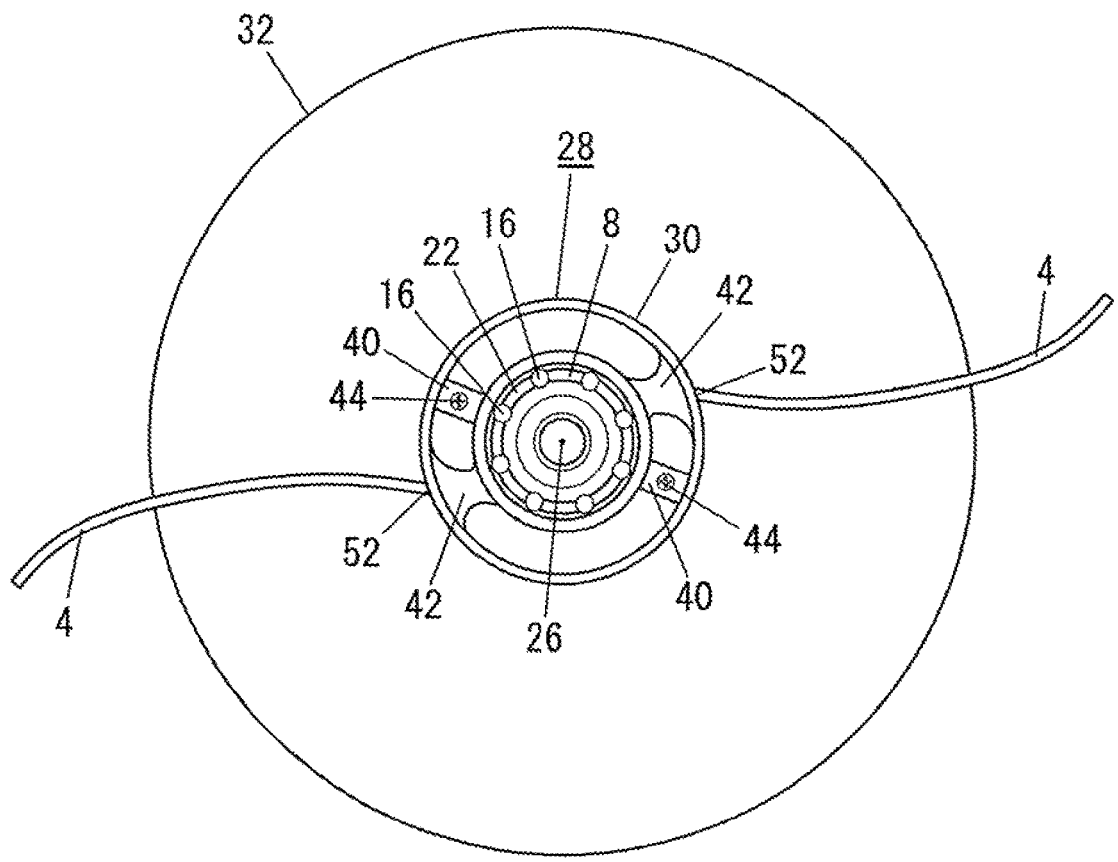
FIG. 1 is a plan view of a rotating body according to a first embodiment of the present invention.
Figure 2:
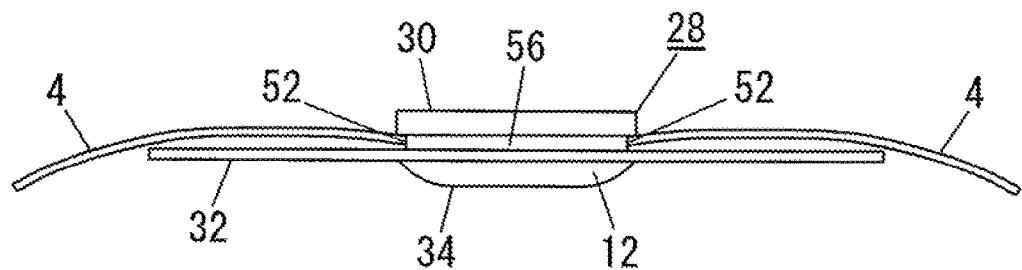
FIG. 2 is a side view of the rotating body according to the first embodiment of the present invention.
Figure 3:
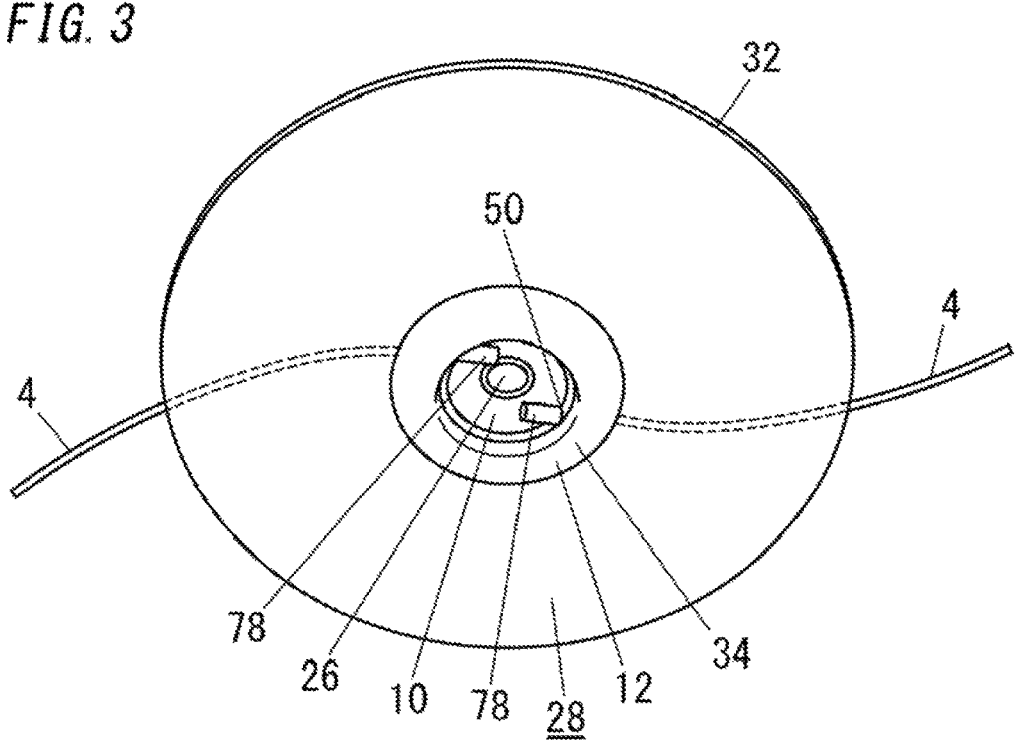
FIG. 3 is a perspective view in which the rotating body according to the first embodiment of the present invention is viewed from obliquely below.

As shown in FIG. 1 to FIG. 3, the rotating body is configured with a main body 28 made of synthetic resin and a brace 8 that is joined to the main body 28. The main body 28 is configured with an upper body 30 to which the brace 8 is joined, a flange portion 32 that is molded to have a diameter larger than that of the upper body 30, and a lower body 34 that is molded to have a diameter smaller than that of the flange portion 32.

The structure of the brace 8 is described hereinafter first, followed by the descriptions of the structures of the upper body 30, the flange portion 32, and the lower body 34 that configure the main body 28. The term "vertical direction" used in the present specification is a reference direction taken when the rotation axis 26 of the rotating body is set perpendicularly.

The brace 8 is a member into which the drive shaft 182 of the mower 180 is inserted and to which the drive shaft 182 is joined by using fastening means.

Figure 9A:
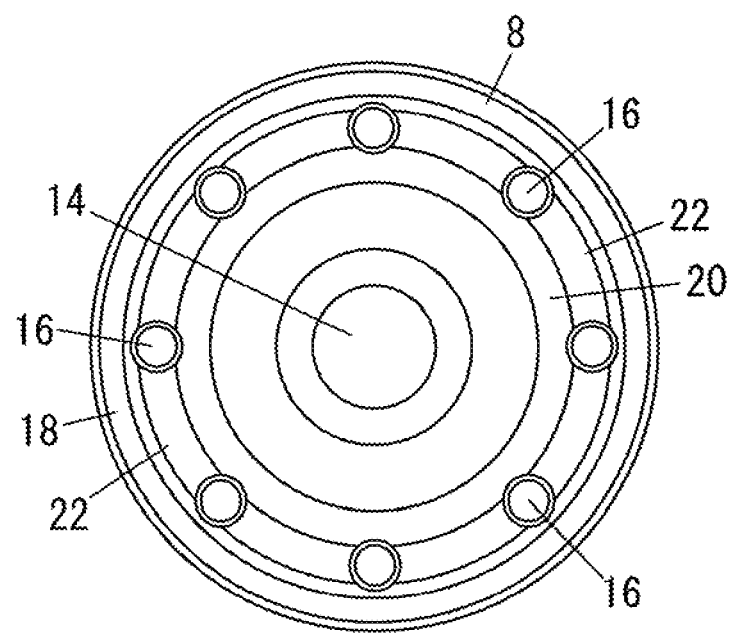
FIG. 9A is a plan view showing a brace that is insert-molded to the upper body according to the first embodiment of the present invention.
Figure 9B:
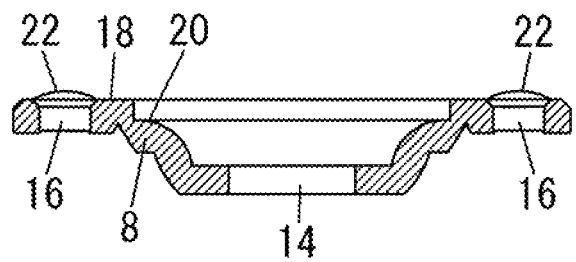
FIG. 9B is a cross-sectional diagram showing the brace that is insert-molded to the upper body according to the first embodiment of the present invention.

The brace 8 is shown in FIG. 9A and FIG. 9B. The brace 8 has, at a middle section thereof, a central hole 14 into which the drive shaft 182 of the mower 180 is inserted, and a plurality of stepped through-holes 16 that are arranged to surround the central hole 14.

The through-holes 16 are disposed in a circumferential direction at equal distances (eight through-holes 16 are provided in the present embodiment). Each of the through-holes 16 is filled with the synthetic resin of the upper body 30 configuring the main body 28 of the rotating body, thereby tightly joining the upper body 30 and the brace 8 to each other.

As shown in FIG. 9A and FIG. 9B, the brace 8 has, on an upper surface thereof, a first installation surface 18 used for installing the rotating blade 184, and on the inside of and under this ring-shaped first installation surface 18 is a second installation surface 20. The second installation surface 20 is a ring-shaped surface used for installing the rotating body to the drive shaft 182 of the mower 180 when the rotating blade 184 is removed.

As shown in FIG. 10, a bracket 194 with a boss 192 projecting therefrom is joined to the drive shaft 182 of the mower 180. The surface of the bracket 194 that surrounds the boss 132 with a step therebetween is a first receiving surface 196 that receives the rotating blade 184 when the rotating blade 184 is mounted. An end surface of the boss 192 is a second receiving surface 198 that receives the second installation surface 20 of the brace 8 when the rotating blade 184 is removed.

The through-holes 16 of the brace 8 are used for insert-molding and are pierced through the brace 8 so the axial ends thereof are opened on the first installation surface 18, as shown in FIG. 9A and FIG. 9B. Each space between the through-holes 16 adjacent to each other in the circumferential direction in the first installation surface 18 configures an abutment rib 22 that is made taller than the rest. A total of eight abutment ribs 22 are segmented in the circumferential direction by the through-holes 16 but formed into a substantially ring shape as a whole. The abutment ribs 22 disposed substantially annularly come into stable abutment with the rotating blade 184.

As shown in FIG. 10, a tip of the drive shaft 182 of the mower 180 is in the shape of a male screw. The boss 192 of the bracket 194 is fitted into a central through-hole of the rotating blade 184, then the tip of the drive shaft 182 that projects downward from the boss 192 is caused to project downward through the central hole 14 of the brace 8 joined to the main body 28, and then a nut 24 is screwed to this projection of the drive shaft 182 from below the main body 28. Consequently, the rotating body and the rotating blade 184 can be joined to the drive shaft 182.

The main body 28 of the rotating body has a depressed section 10 that is opened downward. The portion of the drive shaft 182 that projects downward from the central hole 14 of the brace 8 and the nut 24 screwed to this projection are stored in the depressed section 10. The surface of the main body 28 that surrounds the depressed section 10 is a tapered contact surface 12 that inclines upward and radially outward.

The structure of the synthetic resin main body 28 and the structure for detachably mounting the linear cutters 4 in the main body 28 are described next in detail.

As described above, the main body 28 molded with synthetic resin is configured with the three blocks: the upper body 30, the flange portion 32, and the lower body 34. Each of these blocks is molded individually using synthetic resin. As shown in FIG. 2, the upper body 30, the flange portion 32, and the lower body 34 are joined together in such a manner that these blocks are disposed continuously in this order from top to bottom. In other words, in the main body 28, the flange portion 32 having the largest diameter is held between the upper body 30 and the lower body 34 having substantially an equal diameter.

Figure 4:
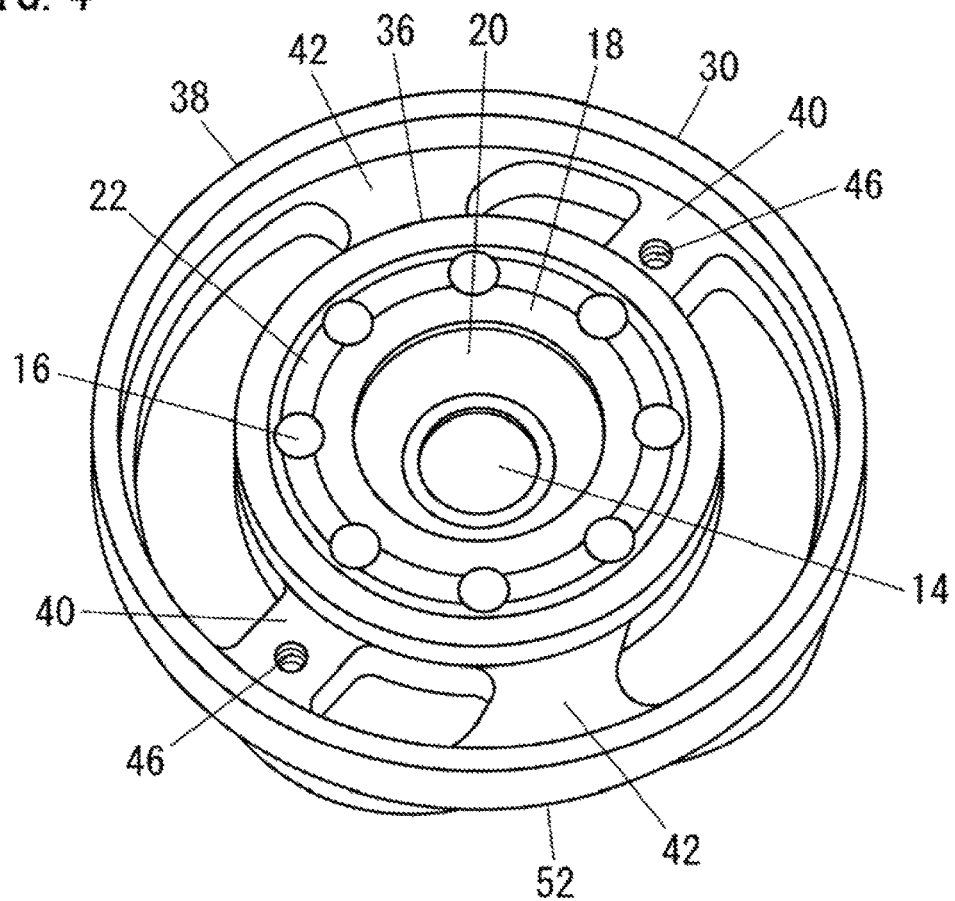
FIG. 4 is a perspective view in which an upper body of the rotating body according to the first embodiment of the present invention is viewed from obliquely above.
Figure 5:
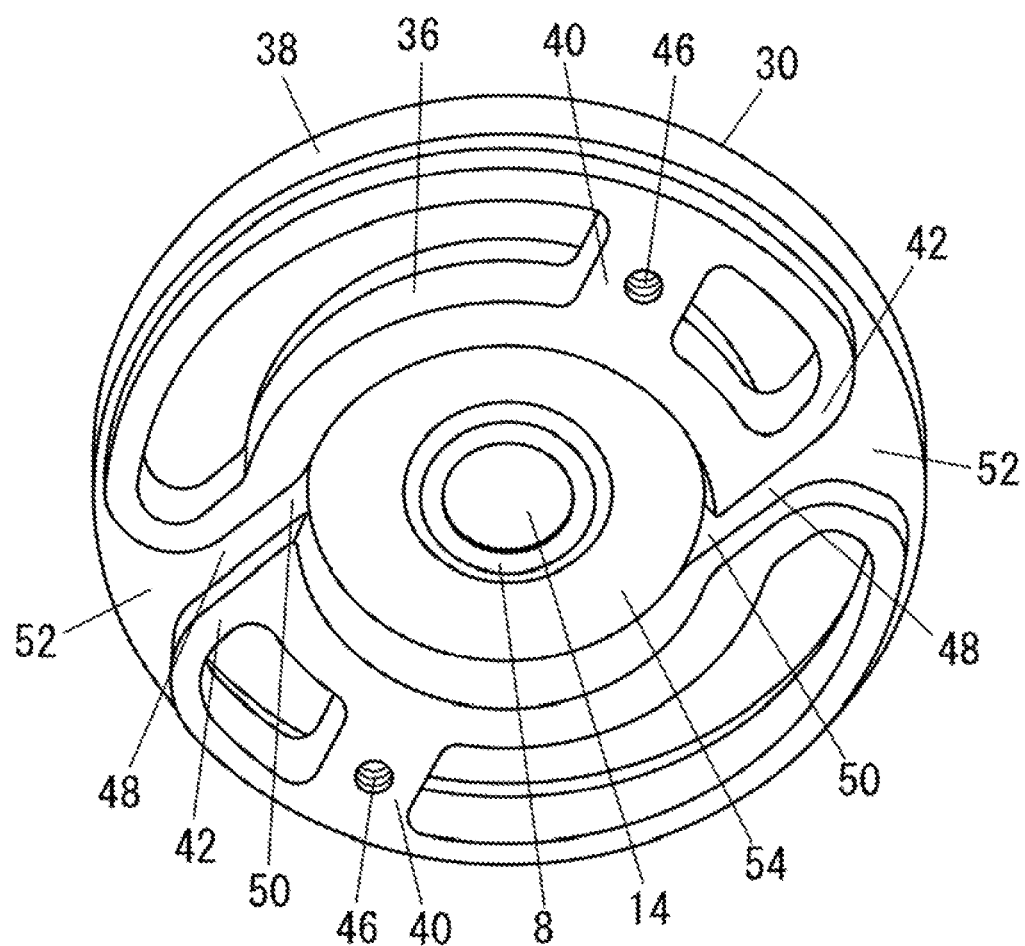
FIG. 5 is a perspective vim in which the upper body according to the first embodiment of the present invention is viewed from obliquely below.

FIG. 4 and FIG. 5 each show the upper body 30. The upper body 30 has a disc-shaped middle portion 36 that is molded integrally with the brace 8 by means of insert-molding, an annular outer circumferential portion 38 surrounding the middle portion 36, a pair of coupling portions 40 molded to radially connect the middle portion 36 and the outer circumferential portion 38, and a pair of insertion portions 42 also molded to radially connect the middle portion 36 and the outer circumferential portion 38.

The pair of coupling portions 40 extend from an outer circumferential surface of the disc-shaped middle portion 36 away from each other. A radially outward end of each coupling portion 40 is coupled integrally to an inner circumferential surface of the annular outer circumferential portion 38. A fixing hole 46 into which a fixture 44 (see FIG. 1, FIG. 10, etc.) is inserted is punctured vertically in the middle section of each coupling portion 40.

The pair of insertion portions 42 similarly extend from the outer circumferential surface of the middle portion 36 away from each other, and a radially outward end of each insertion portion 42 is coupled integrally to an inner circumferential surface of the outer circumferential portion 38. An insertion hole 48 into which a linear cutter 4 can be inserted is punctured radially in each insertion portion 42.

Each of the insertion holes 48 is formed in the upper body 30 and opened downward. This opening is covered with an upper surface of the flange portion 32 when joined to the flange portion 32.

Each of the insertion holes 48 has an introduction port 50 at radially inward end thereof and an outlet 52 at a radially outward end of the same. A lower surface of the middle portion 36 has a circular depressed section 54 that is molded in such a manner that a lower end of the brace 8 is exposed, wherein these introduction ports 50 are located on an inner circumferential surface of the circular depressed section 54. The depressed section 54 of the upper body 30 configures an upper part of the depressed section 10 of the main body 28 when joined to the lower body 34.

A depressed groove 56 is formed over the entire circumference of the outer circumferential surface of the outer circumferential portion 38. The outlets 52 are located on a bottom surface of the depressed groove 56 that is wider than the linear cutters 4. The depressed groove 56 guides the winding of the linear cutters 4 rotated at high speed.

Figure 6:
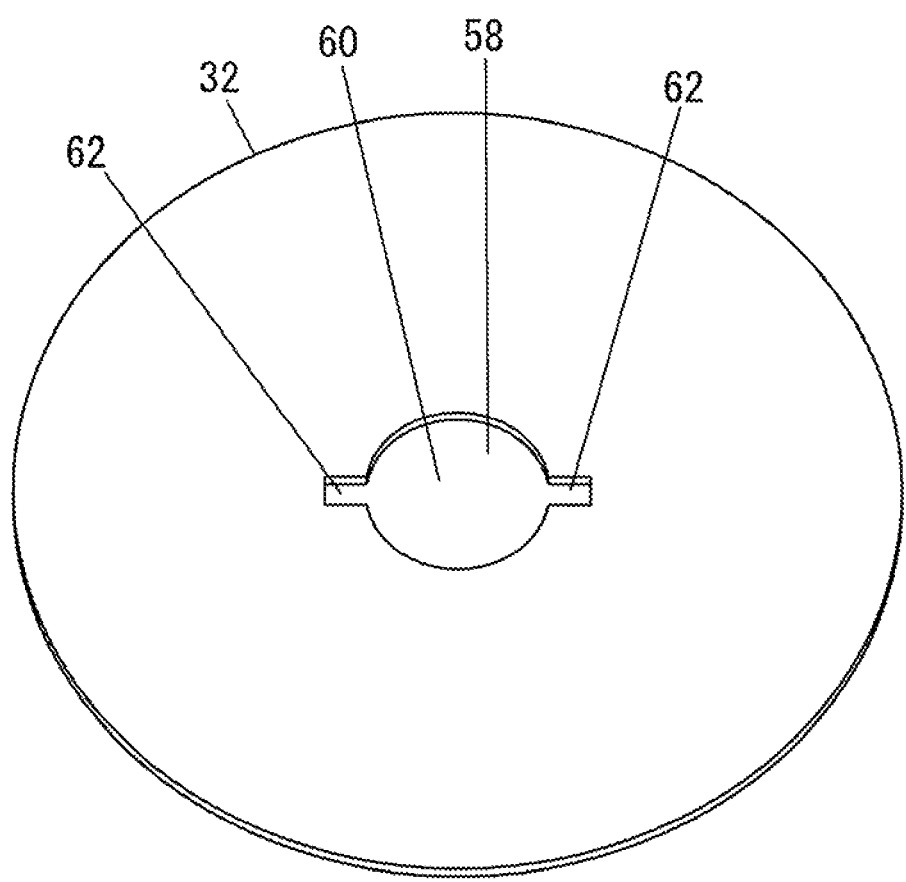
FIG. 6 is a perspective view of a flange portion of the rotating body according to the first embodiment of the present invention.

FIG. 6 shows the flange portion 32. The flange portion 32 is in the shape of a disc and has, in the center, a fitting hole 58 to which an upper end of the lower body 34 is fitted. The fitting hole 58 has a circular hole 60 and has a pair of slit holes 62 extending radially outward from an outer rim of the circular hole 60. The slit holes 62 extend away from each other.

Figure 7:
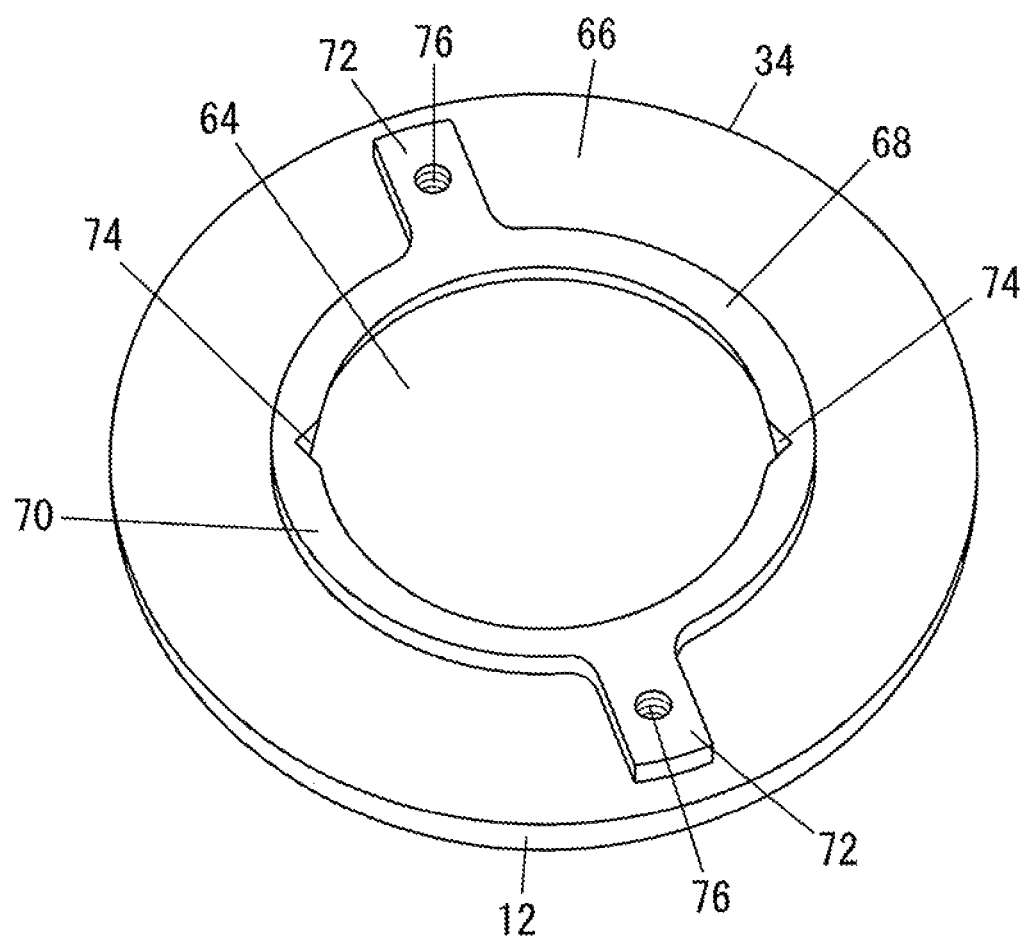
FIG. 7 is a perspective view in which a lower body of the rotating body according to the first embodiment of the present invention is viewed from obliquely above.
Figure 8:
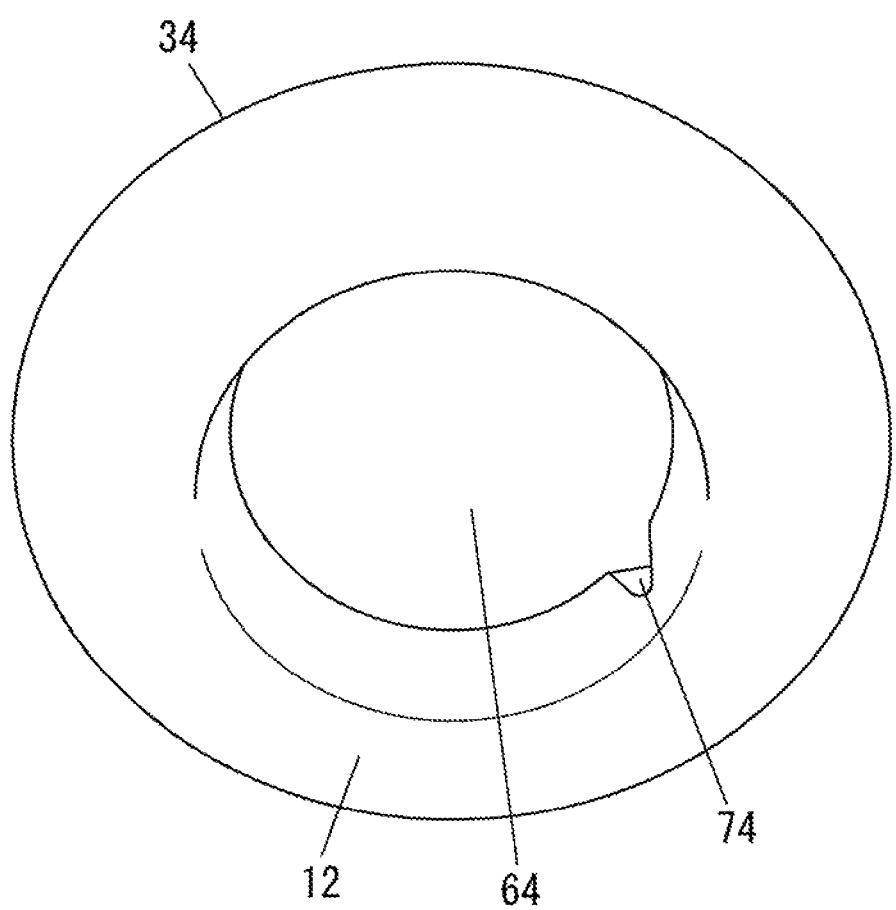
FIG. 8 is a perspective view in which the lower body of the rotating body according to the first embodiment of the present invention is viewed from obliquely below.

FIG. 7 and FIG. 8 each show the lower body 34. The lower body 34 is a donut-shaped resin member that has, in the center, a through-hole 64 that is punctured vertically, and serves as a principal portion of the grounded body. The through-hole 64 configures a lower portion of the depressed section 10 of the main body 28 when joined to the upper body 30. The circumferential surface surrounding the through-hole 64 is the tapered contact surface 12.

The lower body 34 has a flat upper surface 66, wherein the middle section of the upper surface 66 is provided with a fitting portion 68 that is one step higher than the rest. The fitting portion 68 is configured with a ring-shaped protrusion 70 having an upper end opening of the through-hole 64 in the center, and a pair of coupling projections 72 extending radially outward from an outer circumference of the protrusion 70. The coupling projections 72 extend away from each other.

An inner circumferential surface of the ring-shaped protrusion 70 is provided with a pair of notches 74. The notches 74 provided in the lower body 34 are communicated with the introduction ports 50 of the upper body 30 respectively when the lower body 34 and the upper body 30 are joined to each other.

Fixing holes 76 into which the fixtures 44 are inserted are formed in the middle sections of the coupling projections 72. The fixing holes 76 are screw holes into which fixing screws constituting the fixtures 44 are screwed, and are opened on flat upper surfaces of the coupling projections 72.

In order to integrally join the upper body 30, the flange portion 32, and the lower body 34 that are structured as described above, first the fitting portion 68 of the lower body 34 is fitted to the fitting hole 58 of the flange portion 32. In so doing, the protrusion 70 of the fitting portion 68 is fitted to the circular hole 60 of the fitting hole 58, and the coupling projections 72 of the fitting portion 68 are fitted to the slit holes 62 of the fitting hole 58 respectively. As a result of these fitting steps, the flange portion 32 is coupled in an unrotatable manner to the lower body 34.

Next, the upper body 30 is set above the lower body 34 with the flange portion 32 therebetween. In so doing, the fixing holes 46 provided in the coupling portions 40 of the upper body 30 are set in such a manner as to be communicated respectively with the fixing holes 76 provided in the coupling projections 72 of the lower body 34. The fixtures 44 are screwed into the fixing holes 46, 76 that are communicated with each other vertically, and then the fixtures 44 are fastened to the fixing holes 46, 76. In this manner, the upper body 30 is joined in an unrotatable manner to the lower body 34. The flange portion 32 is sandwiched between the flat upper surface 66 of the lower body 34 and the flat lower surface of the upper body 30 (i.e., the lower surfaces of the middle portion 36, outer circumferential portion 38, coupling portions 40, and insertion portions 42 of the upper body 30) in the vertical direction.

In the rotating body that is configured by joining the upper body 30, the flange portion 32, and the lower body 34 as described above, the pair of outlets 52 provided on the outer circumferential surface of the upper body 30 are positioned above the flange portion 32. The depressed section 10 of the rotating body is formed by communicating the through-hole 64 of the lower body 34 with the depressed section 54 of the upper body 30. The depressed section 10 is opened downward.

The tips of the linear cutters 4 are inserted into the depressed section 10 of the rotating body and then into the insertion holes 48 through the introduction ports 50 and pulled radially outward through the outlets 52. The linear cutters 4 that are pulled out of the outlets 52 are positioned above the flange portion 32. The base ends of the linear cutters 4, which are nylon cords, are provided with the large-diameter portions 78. The linear cutters 4 are engaged by having the large-diameter portions 78 hooked to the step portions on the rims of the introduction ports 50 (see FIG. 3). Specifically, the step portions on the rims of the introduction ports 50 that are provided in the depressed section 10 are each the engaging structure for bringing the linear cutter 4 into engagement with the main body 28.

The depressed groove 56 that is molded on the outer circumferential surface of the upper body 30 is located above the flange portion 32 and guides, between the circumferentially adjacent outlets 52, the winding of the linear cutters 4 rotated at high speed.

When mowing grass, the rotating body in which the linear cutters 4 are engaged in the manner described above is joined to the tip of the drive shaft 182 of the mower 180, as shown in FIG. 10 and FIG. 11. FIG. 10 and FIG. 11 show the rotating blade 184 mounted using the rotating body, but grass-mowing can be performed only using the linear cutters 4 without mounting the rotating blade 184.

Driving the rotating body to rotate integrally with the drive shaft 182 applies the centrifugal force to the linear cutters 4 that are pulled out of the outlets 52 of the rotating body, and the tips of the linear cutters 4 are stretched to positions radially outside of the outer edge of the flange portion 32. The flange portion 32 is positioned below the sections of the linear cutters 4 other than the tips thereof. Most parts of the linear cutters 4 except for the tips thereof are prevented from moving downward by the flange portion 32. In this state, the linear cutters 4 are driven to rotate integrally with the flange portion 32.

Therefore, the linear cutters 4 are kept substantially horizontal due to the presence of the flange portion 32. Even when various loads from various directions are placed on the linear cutters 4 during mowing or when the ground surface has a great deal of unevenness, the linear cutters 4 can be prevented from touching the ground surface.

The rotating body according to the present embodiment is configured to prevent the linear cutters 4 from touching the ground surface and to rotate the linear cutters 4 at high speed while keeping the tips thereof at top speed. Therefore, not only is it possible to obtain favorable cutting quality with the tip sections that extend radially outward from the flange portion 32, but also the life of the linear cutters 4 can be increased approximately three times. Moreover, because the rotating body according to the present embodiment has the contact surface 12 below the flange portion 32, grass-mowing can be performed with the rotating body touching the ground surface, cutting down on the operator's labor.

In addition, the flange portion 32 is molded separately from the upper body 30 and the lower body 34 and is structured to be joined detachably. Such a structure enables replacement of the flange portion 32 with the one of a different size/shape according to the situation. Furthermore, the flange portion 32 can be press-molded separately from the upper body 30 and the lower body 34, preventing the occurrence of defects in the flange portion 32, such as warps.

Because the lower body 34 with the contact surface 12 is configured to be detachable, replacement of the lower body 34 alone is possible, when the contact surface 12 becomes worn down or damaged due to use.

Note that the flange portion 32 and the upper body 30 can be molded integrally. In this case, the lower body 34 is joined detachably to the upper body 30 that is molded integrally with the flange portion 32.

Furthermore, the flange portion 32 and the lower body 34 can be molded integrally. In this case, the upper body 30 is joined detachably to the lower body 34 that is molded integrally with the flange portion 32. Alternatively, the upper body 30, the flange portion 32, and the upper body 30 can be molded integrally.

A rotating body according to a second embodiment of the present invention is described next with reference to FIGS. 12A to 12D. Descriptions of the configurations of the rotating body of the present embodiment that are the same as those described in the first embodiment are omitted, and only the distinctive configurations different from those of the first embodiment are described hereinafter in detail.

The rotating body of the present embodiment uses a flange portion 32 through which engaging holes 80 are punctured vertically, as shown in each of FIG. 12A to FIG. 12D. The engaging holes 80 each have a size/shape that enables passage of linear cutters 4 and engagement of large-diameter portions 78 therewith. The flange portion 32 shown in each of FIGS. 12A to 12D has a second engaging structure for bringing the linear cutters 4 into engagement with the flange portion 32 by using the engaging holes 80. The flange portions 32 shown in FIGS. 12A to 12D are different from one another except for the positions of the engaging holes 80.

Figure 12A:
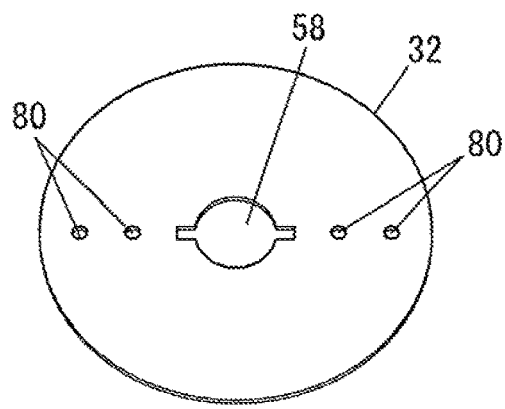
FIG. 12A is a perspective view showing a flange portion of a rotating body according to a second embodiment of the present invention.

In the flange portion 32 shown in FIG. 12A, a fitting hole 58 is located in the center, and two engaging holes 80 are located on one side thereof, and 180 degrees from these engaging holes 80 are two more engaging holes 80. These pairs of engaging holes 80 are each arranged in a radial direction. The tip of a linear cutter 4 can be inserted from above into the radially inward engaging hole 80 of one of the pairs of engaging holes 80 and then through under the flange portion 32. Then the tip of the linear cutter 4 can be pulled upward through the radially outward engaging hole 80, and this causes the linear cutter 4 to be engaged in this section. As a result, grass-mowing can be performed with the tip of the linear cutter 4 that extends radially outward from the outer edge of the flange portion 32. Retaining of the linear cutter 4 can be done by bringing the large-diameter portion 78 of the base end thereof into abutment with the upper surface of the flange portion 32.

According to the rotating body of the present embodiment, first the linear cutters 4 are brought into engagement at the same sections as those described in the first embodiment and used. When becoming worn and short, the tips of the linear cutters 4 can be brought into engagement with the flange portion 32 by using the engaging holes 80.

Figure 12B:
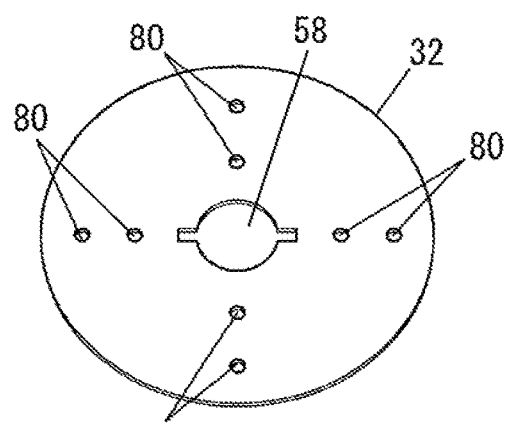
FIG. 12B is a perspective view showing the flange portion of the rotating body according to the second embodiment of the present invention.

In the flange portion 32 shown in FIG. 12B, a pair of engaging holes 80 is provided at four sections that are 90 degrees apart in the circumferential direction, with the fitting hole 58 in the center. With this flange portion 32, the linear cutters 4, worn and short, can be engaged at the total of four sections and used.

Figure 12C:
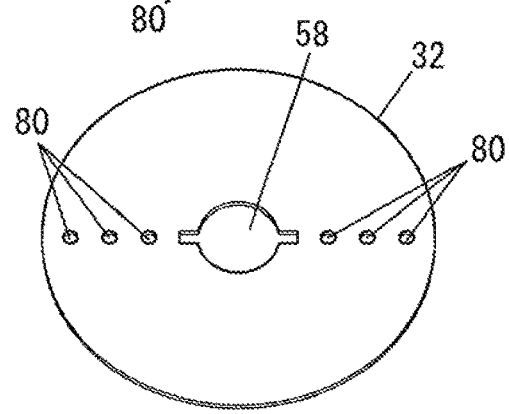
FIG. 12C is a perspective view showing the flange portion of the rotating body according to the second embodiment of the present invention.

In the flange portion 32 shown in FIG. 12C, as with the one shown in FIG. 12A, three engaging holes 80 are arranged radially at each section. Any two of the three arranged engaging holes 80 can be selected and used, so that the linear cutters 4 can be brought into engagement with the flange portion 32 in many more ways.

Figure 12D:
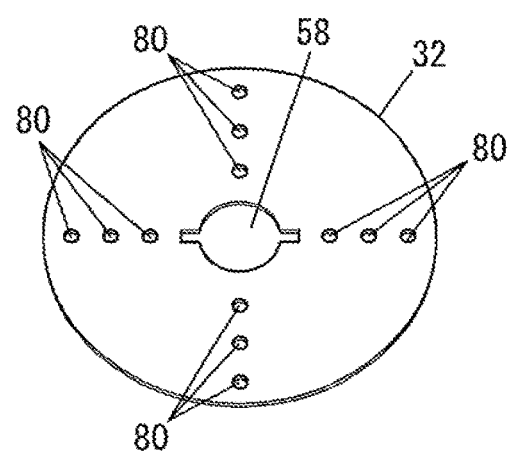
FIG. 12D is a perspective view showing the flange portion of the rotating body according to the second embodiment of the present invention.

In the flange portion 32 shown in FIG. 12D, as with the one shown in FIG. 12B, three engaging holes 80 are arranged radially at each section. According to this configuration of the flange portion 32, the linear cutters 4, when worn and short, can be engaged at the total of four sections and used. In addition, by selecting and using any of the three arranged engaging holes 80, the linear cutters 4 can be brought into engagement with the flange portion 32 in many more ways.

A rotating body according to a third embodiment of the present invention is described next with reference to FIG. 13A to FIG. 13D. Descriptions of the configurations of the rotating body of the present embodiment that are the same as those described in the first embodiment are omitted, and only the distinctive configurations different from those of the first embodiment are described hereinafter in detail.

The rotating body according to the present embodiment uses a flange portion 32 that has hooks 82 shown in each of FIGS. 13A to 13D. The hooks 82 have a size/shape that enables passage of linear cutters 4 and engagement of large-diameter portions 78 therewith. The flange portion 32 shown in each of FIGS. 13A to 13D has a second engaging structure for bringing the linear cutters 4 into engagement with the flange portion 32 by using the hooks 82. The flange portions 32 shown in FIGS. 13A to 13D are the same except for the positions of the hooks 82 therein.

Figure 13A:
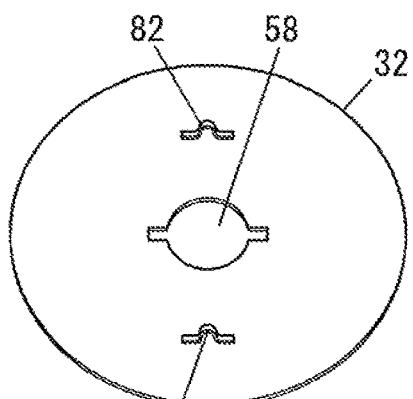
FIG. 13A is a perspective view showing a flange portion of a rotating body according to a third embodiment of the present invention.

In the flange portion 32 shown in FIG. 13A, a fitting hole 58 is located in the center, and one hook 82 is located on one side thereof, and 180 degrees from this hook 82 is another hook 82. A linear cutter 4 is passed through each of these hooks 82, and grass-mowing can be performed with the tip of each linear cutter 4 that extends radially outward from the outer edge of the flange portion 32.

According to the rotating body of the present embodiment, first the linear cutters 4 are brought into engagement at the same sections as those described in the first embodiment and used. When becoming worn and short, the linear cutters 4 can be brought into engagement with the flange portion 32 by using the hooks 82.

Figure 13B:
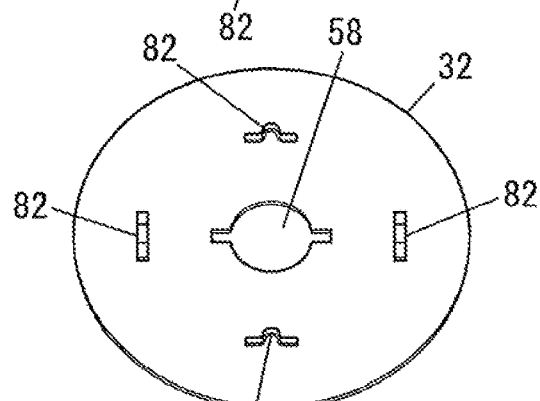
FIG. 13B is a perspective view showing the flange portion of the rotating body according to the third embodiment of the present invention.

The flange portion 32 shown in FIG. 13B has four hooks 82 that are 90 degrees apart in the circumferential direction, with the fitting hole 58 in the center. With this flange portion 32, the linear cutters 4, worn and short, can be engaged at the total of four sections and used.

Figure 13C:
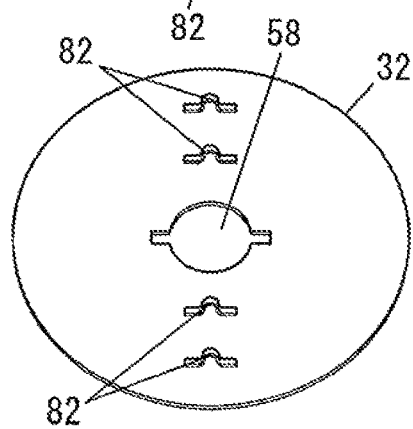
FIG. 13C is a perspective view showing the flange portion of the rotating body according to the third embodiment of the present invention.

In the flange portion 32 shown in FIG. 13C, as with the one shown in FIG. 13A, two hooks 82 are arranged radially at each section. Any of these arranged engaging holes 80 can be selected and used, so that linear cutters 4 can be brought into engagement with the flange portion 32 in many more ways.

Figure 13D:
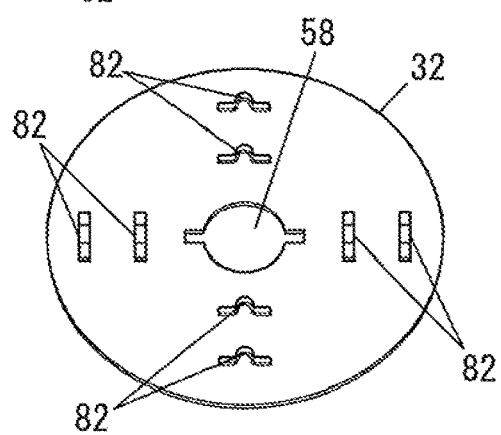
FIG. 13D is a perspective view showing the flange portion of the rotating body according to the third embodiment of the present invention.

In the flange portion 32 shown in FIG. 13D, as with the one shown in FIG. 13B, two engaging holes 80 are arranged radially at each section. According to this configuration of the flange portion 32, the linear cutters 4, worn and short, can be engaged at the total of four sections and used. In addition, by selecting and using any of these arranged engaging holes 80, the linear cutters 4 can be brought into engagement with the flange portion 32 in many more ways.

A rotating body according to a fourth embodiment of the present invention is described next with reference to FIGS. 14 to 16. Descriptions of the configurations of the rotating body of the present embodiment that are the same as those described in the first embodiment are omitted, and only the distinctive configurations different from those of the first embodiment are described hereinafter in detail.

The bottom surface of the depressed section 10 provided in the rotating body of the present embodiment the bottom surface of the depressed section 54 of the upper body 30 is provided with four engaging elements 132 for hooking and engaging the longitudinal portions of linear cutter 4. These four engaging elements 132 are positioned circumferentially at equal distances on a circle with the rotation axis 26 in the center.

Each of the engaging element 132 is in an L shape in which a tip thereof is folded radially outward. The surface of each engaging element 132 that faces radially outward is an engaging surface 133 with which a linear cutter 4 is brought into engagement.

The depressed section 10 of the present embodiment has four introduction ports 50 that have a size/shape that enables insertion of the linear cutters 4. These four introduction ports 50 are positioned circumferentially at equal distances on a circle with the rotation axis 26 in the center.

The outer circumferential surface of the rotating body according to the present embodiment has four outlets 52 that each have a size/shape that enables insertion of the linear cutters 4, the outlets 52 being positioned circumferentially at equal distances. Each of the four outlets 52 is formed at the bottom of the depressed groove 56. The introduction ports 50 and the outlets 52 are communicated with and connected to each other respectively by the insertion holes 48 pierced through the four sections.

In the rotating body of the present embodiment, the plurality of engaging elements 132 and introduction ports 50 that are arranged in the depressed section 10 configure the engaging structure for bringing the linear cutters 4 into engagement with the main body 28.

Figure 14:
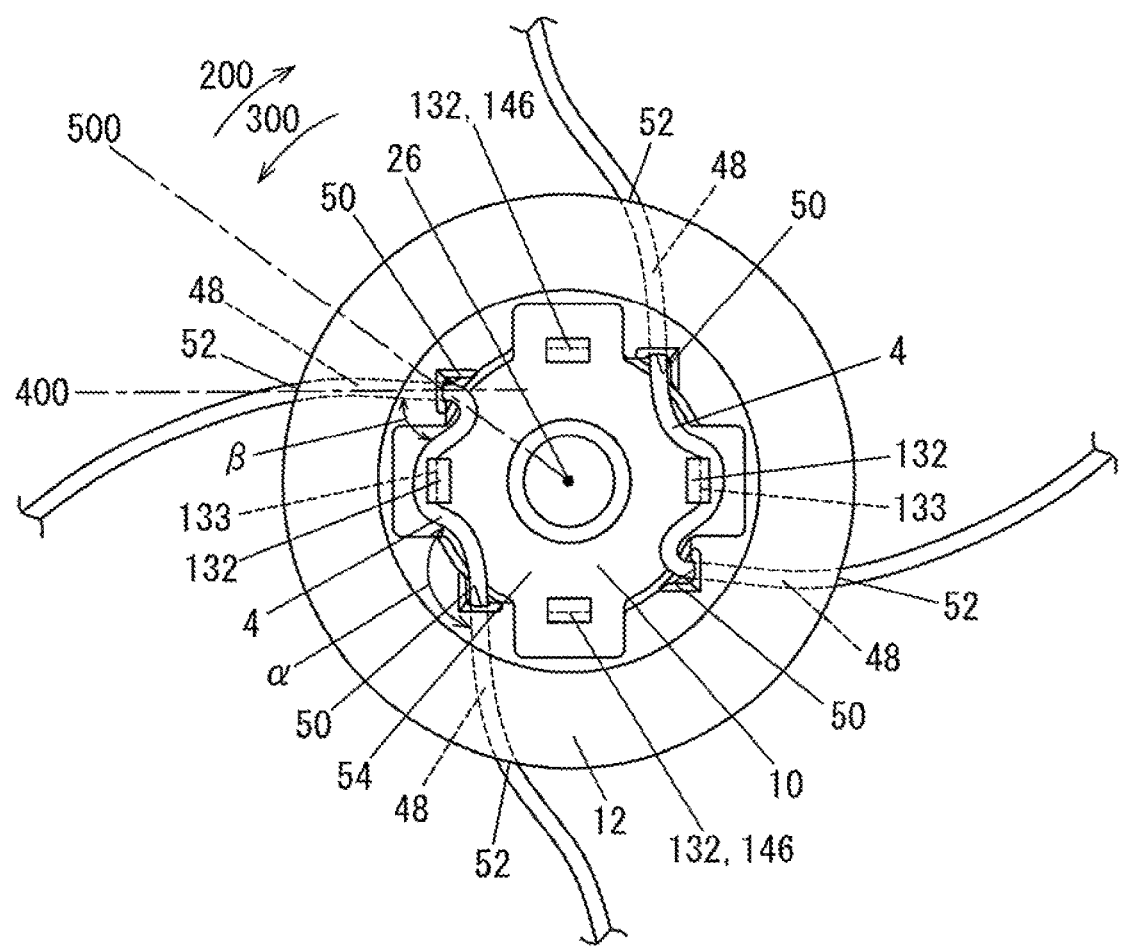
FIG. 14 is a bottom view showing principal portions of a rotating body according to a fourth embodiment of the present invention.

As shown in FIG. 14 in which the rotating body is viewed in the axial direction of the rotation axis 26 (from below), the engaging elements 132 and the introduction ports 50 of the insertion holes 48 are disposed circumferentially in an alternate fashion. The engaging elements 132 are arranged in the following manner: of the two introduction ports 50 that are adjacent to each other circumferentially with an engaging element 132 therebetween, the distance between this engaging element 132 and the introduction port 50 in a rotation direction 200 is shorter than the distance between the engaging element 132 and the introduction port 50 in the direction opposite to the rotation direction 200 of the rotating body ("the reverse direction 300," hereinafter).

Let it be assumed that, at each of the insertion holes 48, when a first virtual line 400 is stretched from one introduction port 50 of a certain insertion hole 48 through the corresponding outlet 52, the first virtual line 400 is inclined in the reverse rotation direction 300 of the rotating body with respect to a second virtual line 500 that extends radially from the rotation axis 26 through the introduction port 50 of the insertion hole 48.

At all the insertion holes 48, the first virtual lines 400 are inclined at the same angle with respect to the radially extending second virtual line 500. In the present embodiment, this angle is approximately 40°.

Figure 15:
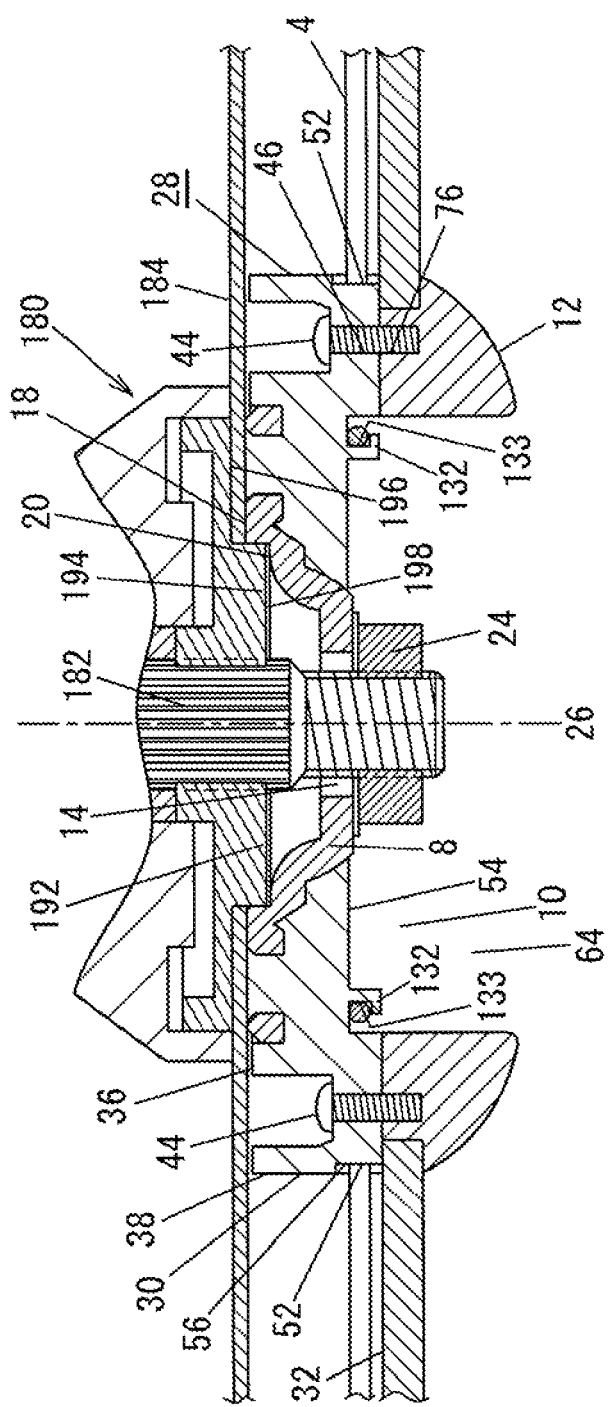
FIG. 15 is a cross-sectional diagram showing a state in which the rotating body according to the fourth embodiment of the present invention is installed in a drive shaft of a mower.

FIG. 14 and FIG. 15 each show a form of installation in which two linear cutters 4 are used and ends of the linear cutters 4 are pulled out of the four sections on the outer circumference of the rotating body. FIG. 16 shows a form of installation in which one linear cutter 4 is used and an end of the linear cutter 4 is pulled out of two sections on the outer circumference of the rotating body.

How the two linear cutters 4 are installed as shown in FIG. 14 and FIG. 15 is described first.

The rotating body has two pairs of insertion holes 48 adjacent to each other in the circumferential direction, wherein one of the linear cutters 4 is installed using one of the pairs of insertion holes 48. Similarly, the other linear cutter 4 is installed using the other pair of insertion holes 48.

The respective linear cutters 4 are in engagement with the engaging elements 132 disposed between the pairs of insertion holes 48, in order to prevent the linear cutters 4 from falling. When hooked to the engaging surfaces 133 of the engaging elements 132, the linear cutters 4 are bent radially outward into a convex shape.

In this case, one of the linear cutters 4 is bent radially inward by a first angle α into a convex shape between one of the insertion holes 48 and the corresponding engaging element 132. This linear cutter 4 is bent radially inward by a second angle β into a convex shape between the other insertion hole 48 and the engaging element 132.

Because the insertion holes 48 on both sides are asymmetrical with respect to the engaging elements 132, as shown in FIG. 14 the first angle α and the second angle β by which each linear cutter 4 is bent are different from each other. The first angle α is an obtuse angle of approximately 130°, whereas the second angle β is an acute angle of approximately 50°.

Most of the retaining force for retaining each of the linear cutters 4 in the rotating body is generated at the section where each linear cutter 4 is bent by the second angle β between the engaging element 132 and the insertion hole 48.

The forms of installation shown in FIG. 14 and FIG. 15 do not require two of the engaging elements 132. These unnecessary engaging elements 132 are members used in the form of installation shown in FIG. 16, i.e., members that function auxiliary engaging elements 146.

Figure 16:
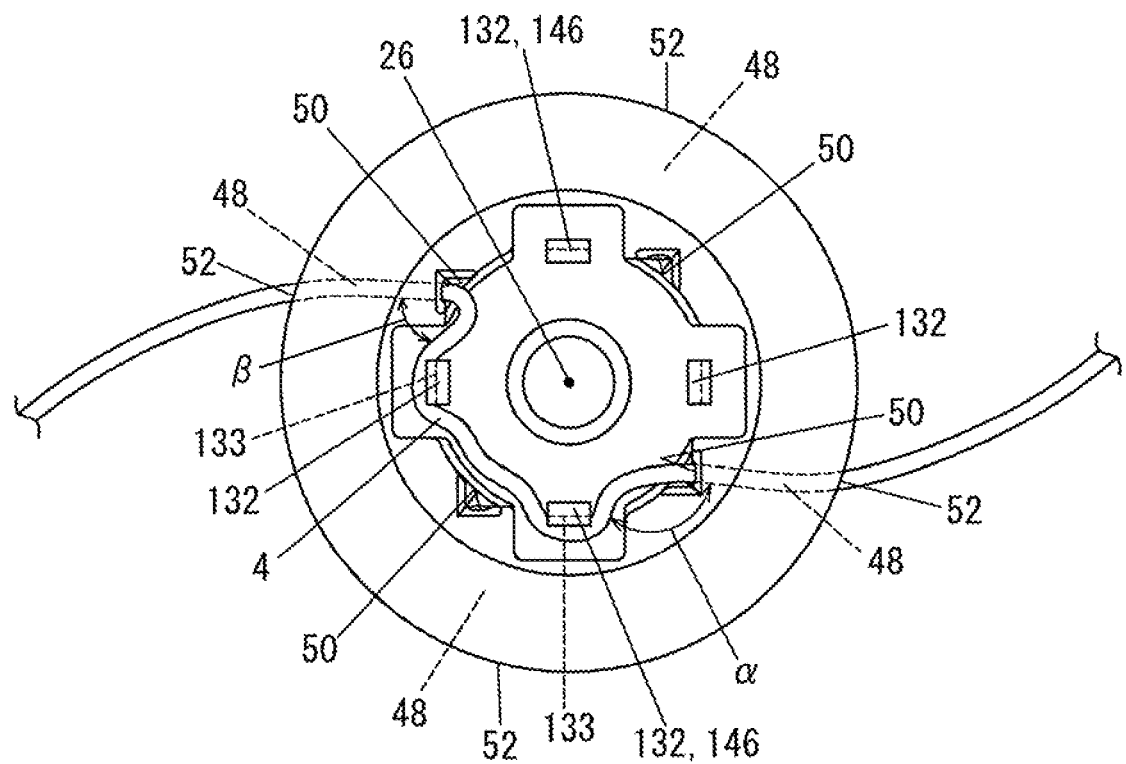
FIG. 16 is a bottom view showing a different way of installing a linear cutter in the rotating body according to the fourth embodiment of the present invention.

In the form of installation shown in FIG. 16, one linear cutter 4 is installed through the insertion holes 48 opposing each other with the rotation axis 26 therebetween.

In this installation form, the middle section of the linear cutter 4 is hooked to two engaging elements 132 that are adjacent to each other in the circumferential direction. The linear cutter 4 is then bent radially outward in a convex shape and hooked to the engaging surfaces 133 of these two adjacent engaging elements 132.

This single linear cutter 4 is bent by the first angle α and retained between one of the insertion holes 48 into which the linear cutter 4 is inserted and the engaging element 132 adjacent to this insertion hole 48. The linear cutter 4 is bent by the second angle β and retained between the other insertion hole 48 into which the linear cutter 4 is inserted and the engaging element 132 adjacent to this insertion hole 48. The first angle α here is an obtuse angle of approximately 130°. The second angle β is an acute angle of approximately 50°.

In the installation form shown in FIG. 16, most of the retaining force for retaining the linear cutter 4 in the rotating body is generated at the section where linear cutter 4 is bent by the second angle β between the engaging element 132 and the insertion hole 48 and the sections where the linear cutter 4 is hooked to the pair of engaging elements 132.

According to the rotating body of the present embodiment, either the installation form for engaging two linear cutters 4 or the installation form for engaging one linear cutter 4 can easily be selected. In either installation form, the linear cutters 4 can be pulled radially outward from a plurality of sections and retained, and the pulled linear cutters 4 are disposed so as to be symmetric with respect to the rotation axis 26.

A nylon cord of an appropriate length may be obtained by cutting a long nylon cord and used as each linear cutter 4. When a linear cutter 4 becomes worn or deteriorated due to use, such linear cutter 4 may be removed from the depressed section 10 of the rotating body and a new linear cutter 4 may be installed.

As described above with reference to the accompanying drawings, the rotating body according to each of the embodiments of the present invention is mounted on the drive shaft 182 of the mower 180, driven to rotate integrally with the drive shaft 182, and equipped with the brace 8 rotated integrally with the drive shaft 182 and the main body 28 made of synthetic resin that is joined to the brace 8. The main body 28 has the upper body 30 that is joined to the brace 8, the flange portion 32 that is molded to have a diameter larger than that of the upper body 30, the lower body 34 that is molded to have a diameter smaller than that of the flange portion 32, and the engaging structure onto which a linear cutter 4 is lathed. The upper body 30 has a plurality of outlets 52 from which one end of the linear cutter 4 engaged with the engaging structure is pulled out. With the upper body 30 and the lower body 34 being integrally joined with the flange portion 32 therebetween, the linear cutter 4 that is pulled out of one of the outlets 52 is positioned above the flange portion 32.

The rotating body of each embodiment enables grass-mowing while having the large-diameter flange portion 32 positioned between linear cutters 4 and the ground surface, preventing the linear cutters 4 from touching the ground surface. Therefore, cutting quality of each linear cutter 4 can be maintained over a long period of time. In other words, use of the rotating body of each embodiment can improve the cutting quality and life of each linear cutter 4.

In the rotating body according to each embodiment, the brace 8 sandwiches the rotating blade 184 with the bracket 194 of the mower 180 in a detachable manner and rotates the sandwiched rotating blade 184 integrally with the drive shaft 182. The flange portion 32 is molded to have a diameter smaller than that of the sandwiched rotating blade 184.

The rotating body according to each embodiment, therefore, enables grass-mowing using the linear cutters 4 and grass-mowing using the rotating blade 184. Because the linear cutters 4 and the rotating blade 184 are made detachable, grass-mowing using the linear cutters 4, grass-mowing using the rotating blade 184, or grass-mowing using both the linear cutters 4 and the rotating blade 184 can be selected.

In the rotating body according to each embodiment, the upper body 30 has the depressed groove 56 on the outer circumferential surface thereof. The depressed groove 56 is provided so as to be positioned between outlets 52 adjacent to each other in the circumferential direction and above the flange portion 32.

Therefore, the depressed groove 56 positioned above the flange portion 32 guides the winding of each linear cutter 4, further preventing each linear cutter 4 from operating in an irregular manner during mowing.

Moreover, in the rotating body according to each embodiment, the upper body 30, the flange portion 32, and the lower body 34 are molded separately, and the flange portion 32 is joined detachably to the upper body 30 and the lower body 34.

Therefore, not only is it possible to replace the flange portion 32 with the one of a different size/shape according to the situation, but also the lower body 34, when worn down or damaged due to use, can be replaced alone. Furthermore, the flange portion 32 can be press-molded separately from the upper body 30 and the lower body 34, hence this prevents the occurrence of defects in the flange portion 32, such as warps.

It also is preferred that the upper body 30 be molded integrally with the flange portion 32 and joined detachably to the lower body 34. It is also preferred that the lower body 34 be molded integrally with the flange portion 32 and joined detachably to the upper body 30.

In these cases as well, the flange portion 32 can be replaced with the one of a different size/shape according to the situation, and a part that is worn down or damaged due to use can be replaced.

In the rotating body according to the second embodiment or the third embodiment, the flange portion 32 has, separately from the engaging structure, the second engaging structure onto which the linear cutters 4 are engaged.

Therefore, first the linear cutters 4 can be engaged with the engaging structure and used, and when the linear cutters 4 become worn and short, the second engaging structure can be used to bring the linear cutters 4 into engagement with the flange portion 32.

In the rotating body according to each embodiment, the upper body 30 has the engaging structure on the lower surface thereof. The lower body 34 is a donut-shaped grounded section with the through-hole 64 in the center. The through-hole 64 houses the end of the drive shaft 182 of the mower 180 and exposes the engaging structure of the upper body 30 downward.

Therefore, using the lower body 34 of the rotating body as a grounded section, grass-mowing can be performed with the rotating body touching the ground surface, cutting down on the operator's labor. In addition, the linear cutters 4 can easily be installed using the through-hole 64 of the lower body 34.

In the rotating body according to the fourth embodiment, the engaging structure includes engaging elements 132 projecting from the lower surface of the upper body 30. One end of a linear cutter 4, which has an intermediate section thereof engaged with the engaging element 132, is pulled radially outward from one of the outlets 52, and the other end of the linear cutter 4 is pulled radially outward from another one of the outlets 52.

Therefore, the linear cutter 4 of a certain length can easily be installed by hooking it to the engaging element 132.

The grass-mowing method using the rotating body of each embodiment mounts the rotating body in the drive shaft 182, pulls ends on one side of the linear cutters 4, engaged with the engaging structure, out of the outlets 52, drives the rotating body to rotate integrally with the drive shaft 182 in this state, and thereby mows grass by using the tip sections of the linear cutters 4 that extend to positions radially outside of the outer edge of the flange portion 32.

According to this grass-mowing method, as described above, the large-diameter flange portion 32 is positioned between each linear cutter 4 and the ground surface, and the tip sections of the linear cutters 4 extending from the outer edge of the flange portion 32 can be used to mown grass. Therefore, grass-mowing can be performed with favorable cutting quality of the tip sections of the linear cutters 4 keeping the top speed, while preventing the linear cutters 4 from touching the ground surface.

The grass-mowing method using the rotating body of the second embodiment or the third embodiment mounts the rotating body on the drive shaft 182, pulls the ends on one side of the linear cutters 4, engaged with the engaging structure, out of the outlets 52, drives the rotating body to rotate integrally with the drive shaft 182 in this state, thereby mows grass by using the tip sections of the linear cutters 4 that extend to the positions radially outside of the outer edge of the flange portion 32, removes the linear cutters 4 from the engaging structure when the linear cutters 4 become short due to use, brings the linear cutters 4 into engagement with the second engaging structure located radially outside of the engaging structure, and thereby stretches the tips of the linear cutters 4 to the positions radially outside of the outer edge of the flange portion 32.

According to this grass-mowing method, as described above, first grass-mowing can be performed using the tip sections of the linear cutters 4 that are engaged with the engaging structure. When the linear cutters 4 become worn and short, the linear cutters 4 can be brought into engagement with the second engaging structure, and grass-mowing can be performed using the tip sections of these linear cutters 4.

The above has described the present invention based on the embodiments illustrated in the accompanying drawings; however, the present invention is not limited to these embodiments. For example, insert-molding is not the only way to join the brace 8 to the upper body 30 thus, press-fitting, screw fixation and other methods may be used.

Also, the method for joining the upper body 30 and the lower body 34 to each other is not limited to the one described in the embodiments in which the fixtures 44 are used. For instance, a male screw structure can be provided to either the upper body 30 or the lower body 34 and a female screw structure to be screwed to the male screw structure can be provided to the other, to join the upper body 30 and the lower body 34 directly to each other. In addition, in the foregoing embodiments, although the lower body 34 is not provided with a depressed groove that indicates the time for replacement, the depressed groove may be formed on the upper surface of the lower body 34 (rear surface of the contact surface 12) so that the depressed groove appears on the contact surface 12 when the contact surface 12 becomes worn to some extent.

For all the other configurations, not only is it possible to make appropriate design change in each example but also the configurations of the examples can be combined as appropriate without departing from the intent of the present invention.

The invention claimed is:

1. A rotating body that is mounted on a drive shaft of a mower and driven to rotate integrally with the drive shaft, the rotating body comprising:
a brace that rotates integrally with the drive shaft; and
a main body made of synthetic resin that is joined to the brace,
wherein the main body has:
an upper body that is joined to the brace;
a flange portion that is molded to have a diameter larger than that of the upper body;
a lower body that is molded to have a diameter smaller than that of the flange portion; and
an engaging structure with which a linear cutter is configured to be engaged,
the upper body has, on an outer circumferential surface thereof, a plurality of outlets, through each of which one end of the linear cutter engaged with the engaging structure is pulled out,
with the upper body and the lower body being integrally joined to each other with the flange portion therebetween, the linear cutter that is pulled out of each of the outlets is positioned above the flange portion, and
the upper body, the flange portion, and the lower body are configured to rotate integrally with each other,
wherein the upper body has the engaging structure on a lower surface thereof,
the lower body is a donut-shaped grounded section with a through-hole in a center thereof,
the through-hole houses an end of the drive shaft of the mower and exposes the engaging structure of the upper body downward,
the upper body is formed with insertion holes that are punctured radially and into which the linear cutter can be inserted, and
each of the insertion holes has an introduction port at a radially inward end thereof and an outlet among said plurality of outlets at a radially outward end thereof.

2. The rotating body according to claim 1, wherein
the brace sandwiches with a bracket of the mower a rotating blade in a detachable manner and rotates the sandwiched rotating blade integrally with the drive shaft, and
the flange portion is molded to have a diameter smaller than that of the sandwiched rotating blade.

3. The rotating body according to claim 2, wherein the engaging structure is arranged above the flange and below the rotating blade.

4. The rotating body according to claim 1, wherein the main body has a depressed groove on the outer circumferential surface thereof, and the depressed groove is positioned between the outlets that are adjacent to each other in a circumferential direction and is also positioned above the flange portion.

5. The rotating body according to claim 1, wherein
the upper body, the flange portion, and the lower body are molded separately, and
the flange portion is joined detachably to the upper body and the lower body.

6. The rotating body according to claim 1, wherein
the upper body is molded integrally with the flange portion and joined detachably to the lower body.

7. The rotating body according to claim 1, wherein
the lower body is molded integrally with the flange portion and joined detachably to the upper body.

8. The rotating body according to claim 1, wherein
the flange portion has, separately from the engaging structure provided at the main body excluding the flange portion, a second engaging structure with which a linear cutter is configured to be engaged.

9. The rotating body according to claim 1, wherein
the engaging structure includes an engaging element that projects from a lower surface of the upper body and is provided in such a manner that one end of the linear cutter, which has an intermediate section thereof engaged with the engaging element, is pulled radially outward from one of the outlets and that the other end of the linear cutter is pulled radially outward from another one of the outlets.

10. A mower equipped with the rotating body of claim 1.

11. The rotating body according to claim 1, wherein
the engaging structure comprises four engaging elements for hooking and engaging longitudinal portions of the linear cutter, the four engaging elements being positioned circumferentially at equal distances on a circle with a rotation axis in the center, and wherein a distance from the rotation axis to each of the four engaging elements is less than a radius of the through-hole of the lower body.

12. The rotating body according to claim 11, wherein
each of the engaging elements is in an L shape in which a tip thereof is folded radially outward and a surface of each engaging element that faces radially outward is an engaging surface with which the linear cutter is brought into engagement.

13. The rotating body according to claim 1, wherein
the entire brace is arranged above both the entire flange portion and the entire lower body.

14. A grass-mowing method comprising:
mounting the rotating body of claim 1 on the drive shaft and pulling one end of the linear cutter, engaged with the engaging structure, out of one of the outlets;
driving the rotating body to rotate integrally with the drive shaft in this state; and
mowing grass by using a tip section of the linear cutter that extends to a position radially outside of an outer edge of the flange portion.

15. The grass-mowing method according to claim 14, wherein the flange portion has, separately from the engaging structure, a second engaging structure with which the linear cutter is engaged
the method further comprising:
removing the linear cutter, which has become short due to use, from the engaging structure and bringing the linear cutter into engagement with the second engaging structure that is located radially outside of the engaging structure; and thereby stretching the tip section of the linear cutter to the position radially outside of the outer edge of the flange portion.

* * * * *